US012316041B2

(12) United States Patent
Hotsuki et al.

(10) Patent No.: US 12,316,041 B2
(45) Date of Patent: May 27, 2025

(54) CONNECTOR

(71) Applicant: IRISO ELECTRONICS CO., LTD., Yokohama (JP)

(72) Inventors: Masaki Hotsuki, Yokohama (JP); Hideki Shioda, Yokohama (JP); Daisuke Noguchi, Yokohama (JP); Yoshihito Okuma, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 333 days.

(21) Appl. No.: 18/184,827

(22) Filed: Mar. 16, 2023

(65) Prior Publication Data

US 2023/0299527 A1 Sep. 21, 2023

(30) Foreign Application Priority Data

Mar. 18, 2022 (JP) ................................ 2022-044559

(51) Int. Cl.

*H01R 13/24* (2006.01)
*H01R 12/91* (2011.01)
*H01R 13/05* (2006.01)
*H01R 13/502* (2006.01)

(52) U.S. Cl.

CPC ......... *H01R 13/2428* (2013.01); *H01R 12/91* (2013.01); *H01R 13/05* (2013.01); *H01R 13/502* (2013.01)

(58) Field of Classification Search

CPC .... H01R 13/2428; H01R 12/91; H01R 13/05; H01R 13/502; H01R 13/2457; H01R 12/57; H01R 13/6474; H01R 12/716

See application file for complete search history.

(56) References Cited

U.S. PATENT DOCUMENTS

| | | | |
|---|---|---|---|
| 7,125,260 | B2 | 10/2006 | Orita et al. |
| 9,022,811 | B2 | 5/2015 | Takaki |
| 9,033,722 | B2 | 5/2015 | Kobayashi et al. |
| 9,033,743 | B2 | 5/2015 | Kobayashi et al. |
| 10,062,995 | B2 | 8/2018 | Doi |
| 10,594,080 | B2 | 3/2020 | Sugiki et al. |
| 2006/0089018 | A1 | 4/2006 | Orita et al. |
| 2014/0134883 | A1 | 5/2014 | Kobayashi et al. |
| 2014/0134890 | A1 | 5/2014 | Kobayashi et al. |

(Continued)

FOREIGN PATENT DOCUMENTS

| | | |
|---|---|---|
| JP | 2002025697 A | 1/2002 |
| JP | 2006120448 A | 5/2006 |

(Continued)

OTHER PUBLICATIONS

Extended European Search Report, for European Patent Application No. 23162519.5, dated Jun. 22, 2023, 10 pages.

*Primary Examiner* — Abdullah A Riyami
*Assistant Examiner* — Nader J Alhawamdeh
(74) *Attorney, Agent, or Firm* — Westman, Champlin & Koehler, P.A.

(57) ABSTRACT

A connector is provided that includes a terminal for which, taking a plate width direction of a first retained portion as a first plate width direction, a plate thickness direction of a second retained portion faces in a direction intersecting with a flat plane perpendicular to the first plate width direction, and that is easy to manufacture and is applicable to high speed transmission.

6 Claims, 9 Drawing Sheets

(56) References Cited

U.S. PATENT DOCUMENTS

| | | | | |
|---|---|---|---|---|
| 2015/0044917 | A1 | 2/2015 | Takaki | |
| 2017/0170588 | A1 | 6/2017 | Doi | |
| 2018/0019555 | A1 | 1/2018 | Shibuya | |
| 2019/0148884 | A1 | 5/2019 | Sugiki et al. | |
| 2020/0127410 | A1* | 4/2020 | Shioda | H01R 43/24 |
| 2020/0176930 | A1* | 6/2020 | Shioda | H01R 13/502 |
| 2020/0295511 | A1* | 9/2020 | Shioda | H01R 12/91 |
| 2021/0280999 | A1* | 9/2021 | Horii | H01R 12/91 |
| 2023/0011865 | A1* | 1/2023 | Kitazawa | H01R 12/91 |
| 2023/0299527 | A1* | 9/2023 | Hotsuki | H01R 12/91<br>439/660 |
| 2023/0299528 | A1* | 9/2023 | Hotsuki | H01R 13/6473<br>439/296 |
| 2025/0055229 | A1* | 2/2025 | Shioda | H01R 12/91 |
| 2025/0055232 | A1* | 2/2025 | Shioda | H01R 12/73 |

FOREIGN PATENT DOCUMENTS

| | | | |
|---|---|---|---|
| JP | 2014099391 | A | 5/2014 |
| JP | 2015035407 | A | 2/2015 |
| JP | 2017111918 | A | 6/2017 |
| JP | 2019091649 | A | 6/2019 |
| JP | 2021026874 | A | 2/2021 |

* cited by examiner

CONNECTOR

CROSS-REFERENCE TO RELATED APPLICATION

This application claims priority under 35 USC 119 from Japanese Patent application No. 2022-044559 filed on Mar. 18, 2022, the disclosure of which is incorporated by reference herein in its entirety.

TECHNICAL FIELD

The present disclosure relates to a connector.

BACKGROUND ART

The connectors described in Patent Documents 1 to 5 include a terminal, a fixed housing, and a movable housing. The terminal includes a fixed-side retained portion retained in a fixed housing, a movable-side retained portion retained in a movable housing, and an intermediate portion coupling the fixed-side retained portion and the movable-side retained portion together.

PATENT DOCUMENTS

Patent Document 1: Japanese Patent Application Laid-Open (JP-A) No. 2015-035407
Patent Document 2: JP-A No. 2006-120448
Patent Document 3: JP-A No. 2014-099391
Patent Document 4: JP-A No. 2017-111918
Patent Document 5: JP-A No. 2021-026874

SUMMARY OF INVENTION

Technical Problem

In the above connectors, taking a plate width direction of the fixed-side retained portion (first retained portion) as a first plate width direction, then a plate thickness direction of the movable-side retained portion (second retained portion) faces in a direction parallel to a flat plane perpendicular to the first plate width direction. Such a configuration leads to various restrictions arising in relation to the design of the connector.

An issue addressed by the present disclosure is to provide a connector that includes a terminal for which, taking a plate width direction of a first retained portion as a first plate width direction, a plate thickness direction of a second retained portion faces in a direction intersecting with a flat plane perpendicular to the first plate width direction, and that is easy to manufacture and is applicable to high speed transmission.

Solution to Problem

A connector according to a first aspect is a connector including a terminal, a first housing, and a second housing capable of moving with respect to the first housing. In the connector the terminal includes a first retained portion retained in the first housing, a second retained portion retained in the second housing, and an intermediate portion coupling the first retained portion and the second retained portion together. Taking a plate width direction of the first retained portion as a first plate width direction, then a plate thickness direction of the second retained portion faces in a direction intersecting with a plane perpendicular to the first plate width direction. The intermediate portion includes a plate thickness direction switching portion. The plate thickness direction switching portion includes a switching-bend portion bent in a plate thickness direction, a first plate face portion formed further to a side of the first retained portion with respect to the switching-bend portion and having a plate thickness direction facing in a direction parallel to a plane perpendicular to the first plate width direction, and a second plate face portion formed further to a side of the second retained portion with respect to the switching-bend portion and having a plate thickness direction facing in a direction intersecting with a plane perpendicular to the first plate width direction.

In the present aspect the connector includes the terminal, the first housing, and the second housing.

The terminal includes the first retained portion retained in the first housing, the second retained portion retained in the second housing, and the intermediate portion coupling the first retained portion and the second retained portion together.

Taking the plate width direction of the first retained portion as the first plate width direction, then the plate thickness direction of the second retained portion faces in the direction intersecting with the plane perpendicular to the first plate width direction.

The intermediate portion includes the plate thickness direction switching portion. The plate thickness direction switching portion includes a switching-bend portion bent in a plate thickness direction, the first plate face portion formed further to the first retained portion side with respect to the switching-bend portion, and the second plate face portion formed further to the second retained portion side with respect to the switching-bend portion.

The first plate face portion has a plate thickness direction facing in the direction parallel to the plane perpendicular to the first plate width direction. This means that a simple shape is sufficient for a portion connecting the first retained portion and the first plate face portion together.

The second plate face portion has a plate thickness direction facing in the direction intersecting with the plane perpendicular to the first plate width direction. This means that a simple shape is sufficient for a portion connecting the second retained portion and the second plate face portion together.

The intermediate portion includes the plate thickness direction switching portion, and so this enables the connector to be applied to high speed transmission. This is because although the impedance is liable to rise at the intermediate portion not retained by either of the housings, adjustment of the impedance can be performed by forming the intermediate portion with the plate thickness direction switching portion having a cross-sectional area readily enlarged.

Note that although in the exemplary embodiment described later an example is described in which the plate thickness direction of the second retained portion faces in a direction "orthogonal" to a plane perpendicular to the first plate width direction, the present aspect is not limited thereto. The plate thickness direction of the second retained portion may face in a direction "intersecting" with a plane perpendicular to the first plate width direction. In the present disclosure "intersecting" means crossing at an angle of 45° or greater. However, for matters described as "intersecting" in the present disclosure, crossing at an angle of 60° or greater is preferable, and crossing at an angle of 80° or greater is more preferable.

Moreover, although in the exemplary embodiment described later an example is described in which the first retained portion is press-fitted into the first housing and retained therein, the present aspect is not limited thereto. The first retained portion may be retained in the first housing by insert molding. Similar applies to the second retained portion.

Moreover, although in the exemplary embodiment described later an example is described in which the connector is equipped with plural terminals, and each of these plural terminals corresponds to the "terminal" of the present aspect, the present aspect is not limited thereto. At least one terminal is sufficient.

Moreover, although in the exemplary embodiment described later an example is described in which the plate thickness direction of the second plate face portion and the plate thickness direction of the second retained portion are parallel to each to each other, the present aspect is not limited thereto, and these are not necessarily parallel.

Moreover, although in the exemplary embodiment described later an example is described in which the first housing is a fixed housing and the second housing is a movable housing, the present aspect is not limited thereto, and, for example, these housings may be reversed.

A connector according to a second aspect is the first aspect, wherein the intermediate portion includes a first coupling portion that couples the first retained portion and the first plate face portion together, and that extends from the first retained portion to the first plate face portion with a plate thickness direction facing in a direction parallel to a plane perpendicular to the first plate width direction, and the first coupling portion includes a bent portion bent such that a plate thickness direction changes within a plane perpendicular to the first plate width direction.

In the present aspect the intermediate portion includes the first coupling portion that couples the first retained portion and the first plate face portion together, and that extends from the first retained portion to the first plate face portion with a plate thickness direction facing in the direction parallel to the plane perpendicular to the first plate width direction.

The first coupling portion includes the bent portion bent such that a plate thickness direction changes within the plane perpendicular to the first plate width direction. This facilitates making the connector more compact in the extension direction of the first retained portion compared to embodiments in which the first coupling portion lacks such a bent portion.

The connector according to a third aspect is the first aspect, wherein the intermediate portion includes a first coupling portion that couples the first retained portion and the first plate face portion together and that extends from the first retained portion to the first plate face portion with a plate thickness direction facing in a direction parallel to a plane perpendicular to the first plate width direction, and a first impedance adjustment section that extends from the first coupling portion with a plate thickness direction facing in a direction intersecting with a plane perpendicular to the first plate width direction.

The present aspect includes the first impedance adjustment section that extends from the first coupling portion with a plate thickness direction facing in the direction intersecting with the plane perpendicular to the first plate width direction.

This enables the impedance of the intermediate portion to be lowered while suppressing the dimension of the intermediate portion from becoming large in the first plate width direction.

Note that in the exemplary embodiment described later an example is described in which the first impedance adjustment section has a flat plate shape. However, the first impedance adjustment section of the present aspect is not limited thereto.

Moreover, in the exemplary embodiment described later an example is described in which a flat plate portion of the first impedance adjustment section is parallel to a second plate face portion. However, the first impedance adjustment section of the present aspect is not limited thereto.

A connector according to a fourth aspect is the third aspect, wherein the first coupling portion is a bent portion bent such that a plate thickness direction changes within a plane perpendicular to the first plate width direction, and includes a second bent portion formed at a position further to a side of the plate thickness direction switching portion than a portion of the first coupling portion from where the first impedance adjustment section extends.

In the present aspect the first coupling portion includes the switching portion-side bent portion. The switching portion-side bent portion is a bent portion bent such that the plate thickness direction changes within the plane perpendicular to the first plate width direction, and is a bent portion formed at the position further to the plate thickness direction switching portion side than the portion of the first coupling portion from where the first impedance adjustment section extends.

This means that, differently to an embodiment in which the first coupling portion lacks the switching portion-side bent portion, the plate thickness direction of the first plate face portion can be a direction different to the plate thickness direction of the portion of the first coupling portion from where the first impedance adjustment section extends.

The connector according to a fifth aspect is any one of the first to fourth aspects, wherein the intermediate portion includes a second coupling portion that couples the second plate face portion and the second retained portion together, and a second impedance adjustment section that extends from the second coupling portion and has a plate thickness direction facing in a different direction to a plate thickness direction of an extended portion of the second coupling portion.

In the present aspect the intermediate portion includes the second impedance adjustment section that extends from the second coupling portion and has a plate thickness direction facing in a different direction to the plate thickness direction of the extended portion of the second coupling portion.

This thereby enables the impedance of the intermediate portion to be lowered while suppressing the dimension of the intermediate portion from becoming larger in the plate width direction of the second coupling portion.

A connector according to a sixth aspect is any one of the first to fifth aspects, wherein the second retained portion has a plate thickness direction facing in the first plate width direction, and a distance in the first plate width direction between the second retained portion and the first retained portion is smaller than a distance in the first plate width direction between the switching-bend portion and the first retained portion.

In the present aspect the second retained portion has a plate thickness direction facing in the first plate width direction. The distance in the first plate width direction between the second retained portion and the first retained portion is smaller than the distance in the first plate width direction between the switching-bend portion and the first retained portion.

This means that the connector can be made more compact in the first plate width direction than embodiments in which the distance in the first plate width direction between the second retained portion and the first retained portion is the same as the distance in the first plate width direction between the switching-bend portion and the first retained portion.

DESCRIPTION OF EMBODIMENTS

Description follows regarding a connector 100 that is an exemplary embodiment of a connector of the present disclosure.

In each of the drawings, an arrow X will be referred to as a connector front-rear direction, an arrow Y as a connector width direction, and an arrow Z as a connector up-down direction.

Connector 100

Figure 1:
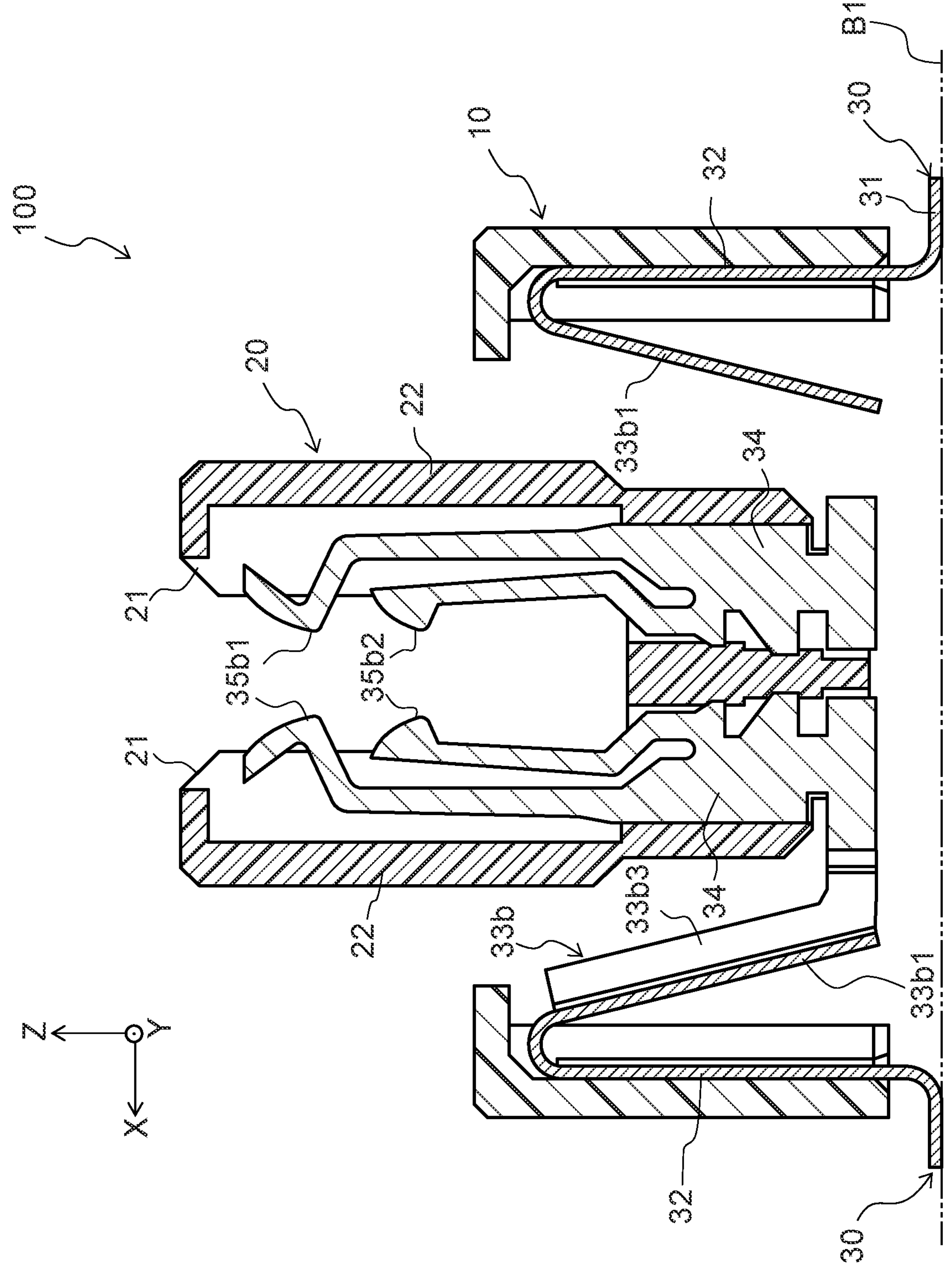
FIG. 1 is a cross-section of a connector.
Figure 2:
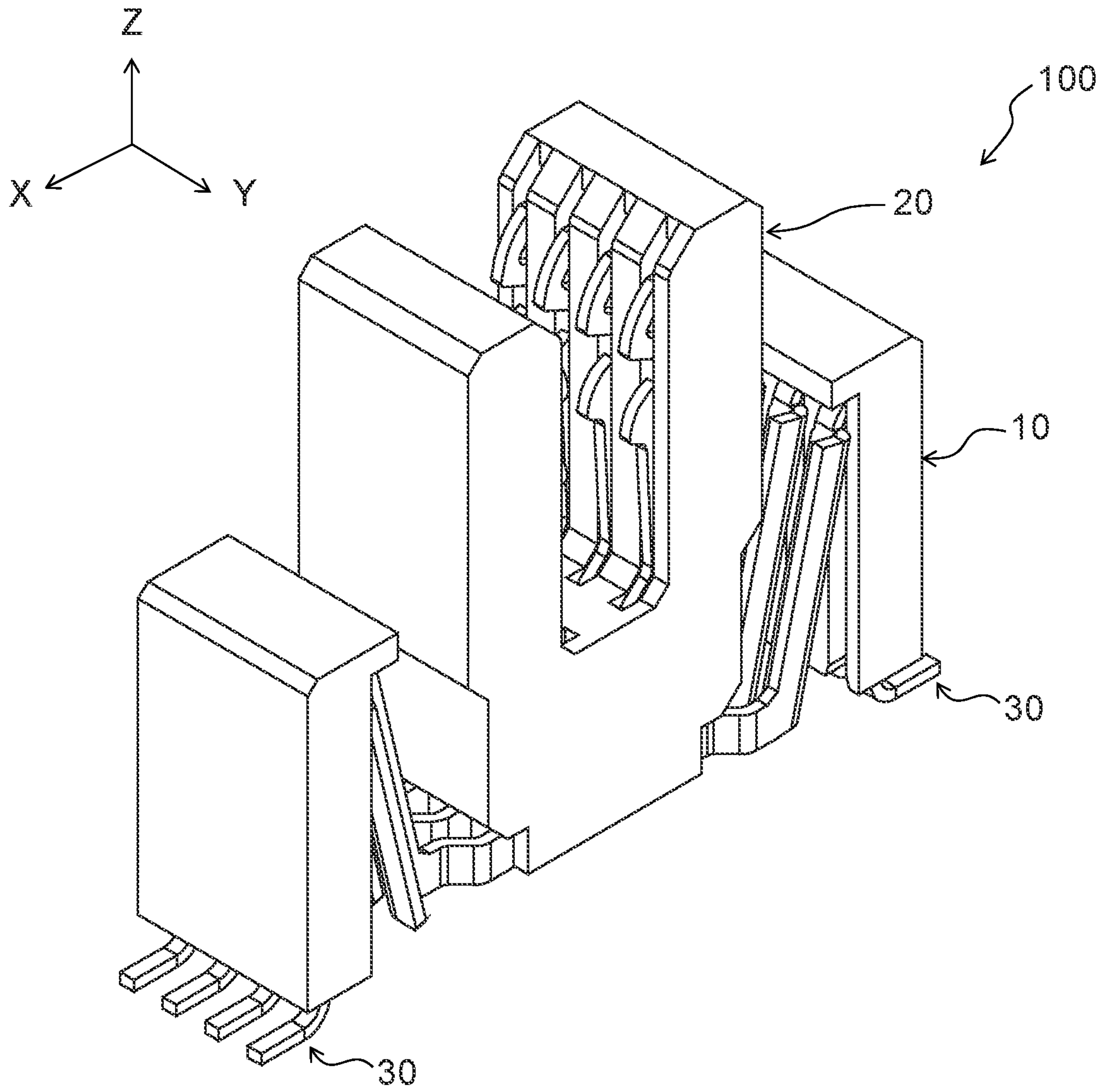
FIG. 2 is a perspective view of a connector.
Figure 3:
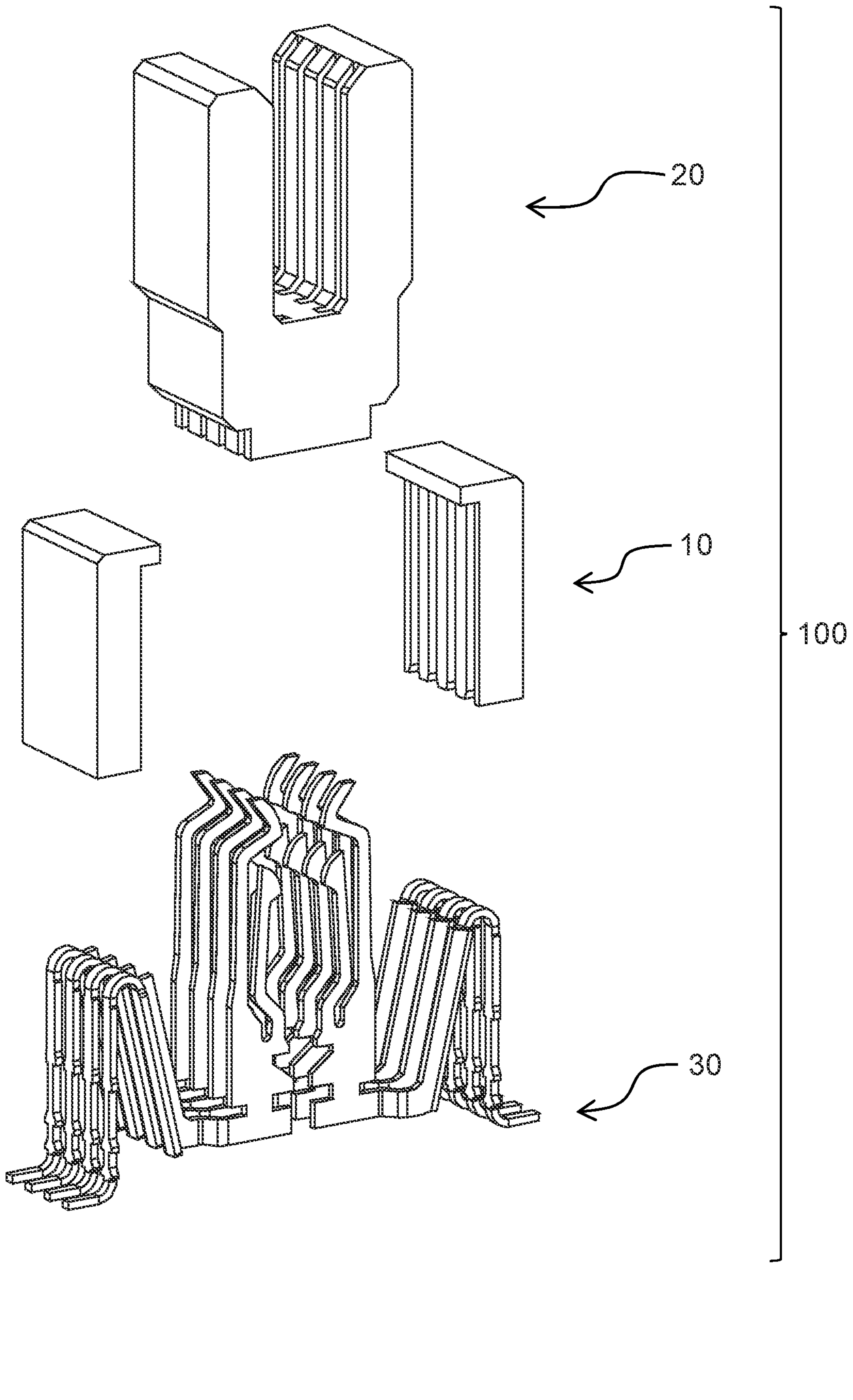
FIG. 3 is an exploded perspective view of a connector.

As illustrated in FIG. 1 to FIG. 3, the connector 100 includes housings 10, 20, and plural terminals 30. The housings 10, 20 include a fixed housing 10 and a movable housing 20.

The fixed housing 10 is a housing fixed to a board B1 that is a mounting target of the connector 100. The fixed housing 10 is fixed to the board B1 through the plural terminals 30.

The movable housing 20 is a housing provided so as to be able to move with respect to the fixed housing 10. The movable housing 20 is supported by the plural terminals 30 in a floating state.

The fixed housing 10 and the movable housing 20 are formed from an insulator such as a synthetic resin or the like.

The terminals 30 are connected to the board B1 and to counterpart terminals (omitted in the drawings) of a counterpart connector (omitted in the drawings). The terminals 30 are made by performing punch and bending processing and the like to a conductive plate material. Each of the plural terminals 30 has the same shape as each other.

The plural terminals 30 are configured from plural (four in the drawing) front-side terminals 30 and by plural (four in the drawing) rear-side terminals 30. A front-side terminal 30 and a rear-side terminal 30 together configure a pair of terminals 30 (see FIG. 4), and these pairs of terminals 30 can be thought of as being arrayed with the Y direction as their array direction. The terminals 30 in a pair are arranged opposing each other such that their contact portion-side directions (direction of the positions of contact portions **35*b*1, 35*b*2 with respect to a connection portion 31** when viewed along the Z direction) face toward the X direction inside.

Next, detailed description follows regarding the terminals 30.

Figure 4:
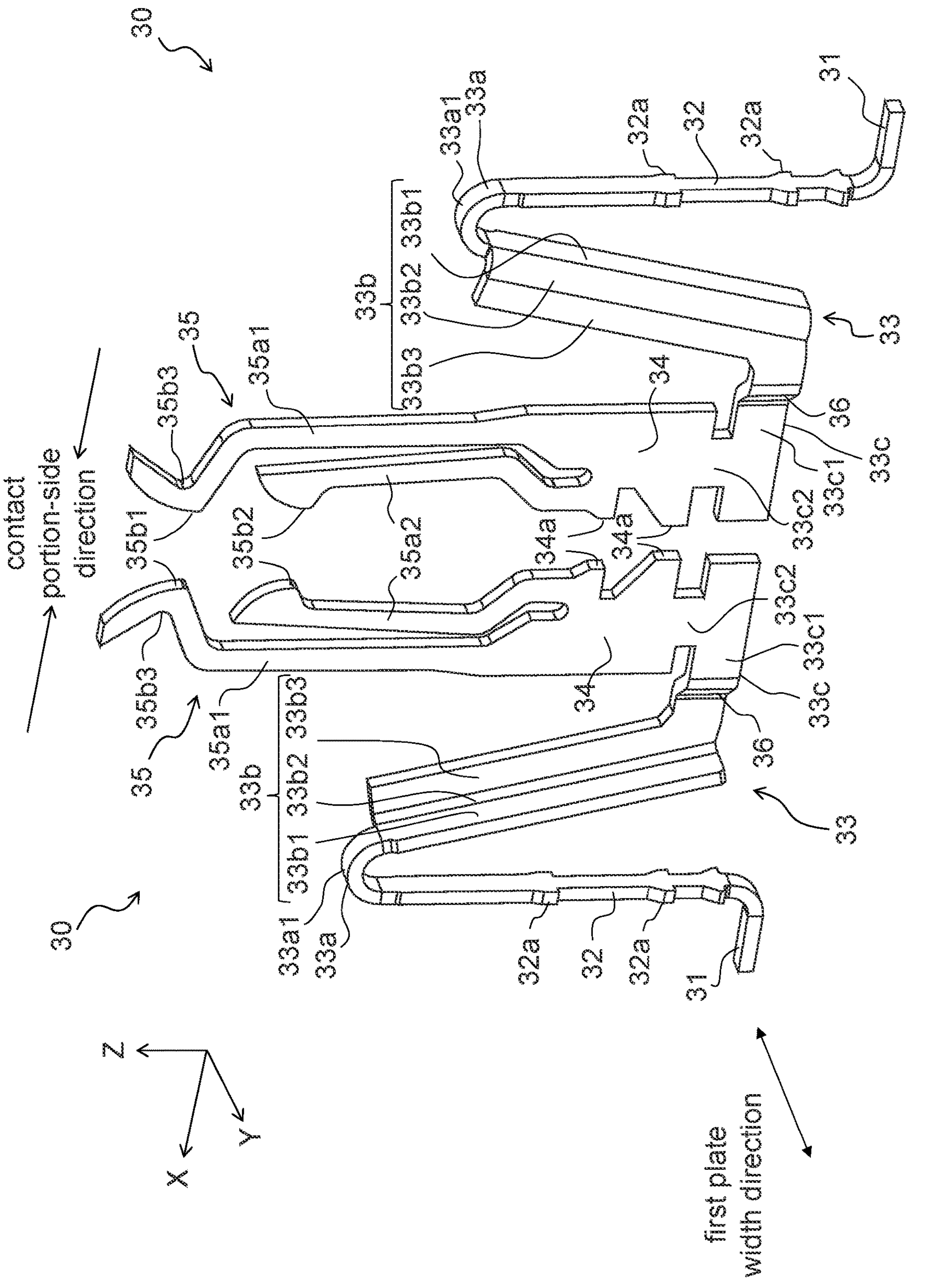
FIG. 4 is a perspective view of a front-rear pair of terminals.

As illustrated in FIG. 4, the terminals 30 each include the connection portion 31, a fixed-side retained portion 32, an intermediate portion 33, a movable-side retained portion 34, and a leading end portion 35, in that order.

The connection portion 31 is a portion connected to the board B1 that is the mounting target.

The connection portion 31 extends from the fixed-side retained portion 32 toward the X direction outside, this being a direction along a plane of the board B1. The connection portion 31 is soldered to a face of the board B1.

The fixed-side retained portion 32 is a portion retained in the fixed housing 10.

The fixed-side retained portion 32 is retained in the fixed housing 10 by being press-fitted into the fixed housing 10 with a +Z direction as the press-fit direction. The fixed-side retained portion 32 has a plate width direction (the plate width direction of the fixed-side retained portion 32 is sometimes referred to as a "first plate width direction") facing in the Y direction that is the terminal array direction, and extends in the +Z direction. The fixed-side retained portion 32 includes press-fit protrusions **32*a*. The press-fit protrusions 32*a* are formed at both plate width direction sides of the fixed-side retained portion 32**.

The intermediate portion 33 is a portion that couples the fixed-side retained portion 32 and the movable-side retained portion 34 together, and is a portion formed deformable so as to enable the movable-side retained portion 34 to displace with respect to the fixed-side retained portion 32.

The intermediate portion 33 includes a first coupling portion **33*a*, a plate thickness direction switching portion 33*b*, and a second coupling portion 33*c***, in this order.

The first coupling portion **33*a* couples the fixed-side retained portion 32 and the plate thickness direction switching portion 33*b* together. The first coupling portion 33*a* extends from the fixed-side retained portion 32 to a first plate face portion 33*b*1 of the plate thickness direction switching portion 33*b***, and has a plate thickness direction facing in a direction parallel to a ZX plane (a plane perpendicular to the first plate width direction).

The first coupling portion **33*a* includes a first bent portion 33*a*1**.

The first bent portion **33*al* couples the fixed-side retained portion 32 and the first plate face portion 33*b*1 of the plate thickness direction switching portion 33*b* together. The first bent portion 33*al* is a portion bent in the plate thickness direction, and switches a Z direction component of the extension direction of the terminals 30** from plus to minus.

The plate thickness direction switching portion **33*b* switches the plate thickness direction of the terminal 30** from the ZX plane direction to the Y direction (a direction orthogonal to the ZX plane).

The plate thickness direction switching portion **33*b* includes a switching-bend portion 33*b*2, the first plate face portion 33*b*1, and a second plate face portion 33*b*3**.

The switching-bend portion **33*b*2 is a portion bent in the plate thickness direction, and couples the first plate face portion 33*b*1 and the second plate face portion 33*b*3** together.

The first plate face portion **33*b*1 is formed at a fixed-side retained portion 32 side with respect to the switching-bend portion 33*b*2. The first plate face portion 33*b*1** has a flat plate shape, with a plate thickness direction facing in the ZX plane direction.

The first plate face portion **33*b*1 can be thought of as being a portion connected to the first coupling portion 33*a*** and extending toward the other end side (contact portion **35*b*1, 35*b*2 side) of the terminal 30. When thought of in this manner, the first plate face portion 33*b*1 is a portion having an extension direction having a straight line shape. The extension direction of the first plate face portion 33*b*1 is a direction inclined toward the −Z direction and the X direction inside. The plate width direction of the first plate face portion 33*b*1** faces along the Y direction that is the first plate width direction.

The second plate face portion **33*b*3 is formed on the movable-side retained portion 34 side with respect to the switching-bend portion 33*b*2. The second plate face portion 33*b*3** has a flat plate shape with a plate thickness direction facing in the Y direction (a direction orthogonal to the ZX plane).

The second plate face portion **33*b*3 is parallel to the first plate face portion 33*b*1, and can be thought of as being a portion extending toward the other end side (contact portion 35*b*1, 35*b*2 side) of the terminal 30. When thought of in this manner, the second plate face portion 33*b*3 is a portion having a straight line shaped extension direction. The extension direction of the second plate face portion 33*b*3** is a direction inclined toward the −Z direction and the X direction inside.

The second coupling portion **33*c* is a portion that couples the plate thickness direction switching portion 33*b* and the movable-side retained portion 34** together.

The second coupling portion **33*c* includes an X direction extension portion 33*cl* and a Z direction extension portion 33*c*2**.

The X direction extension portion **33*cl* extends toward the X direction inside from the other end of the second plate face portion 33*b*3 of the plate thickness direction switching portion 33*b***.

A displacement portion 36 is formed to the X direction extension portion **33*c*1**.

The displacement portion 36 is configured by two bent portions bent in opposite directions to each other at the same angle (preferably an angle less than 90° as illustrated in the drawings). These two bent portions are bent in the plate thickness direction so as to change the plate thickness direction of the second coupling portion **33*c* within an XY plane. The plate thickness direction of a portion further to the other end side of the second coupling portion 33*c* (the movable-side retained portion 34 side thereof) than the displacement portion 36 thereby faces in the Y direction, and a Y direction position of a portion of the second coupling portion 33*c* further to the other end side than the displacement portion 36 is thereby aligned with a Y direction position of the fixed-side retained portion 32. Namely, a Y direction position of the terminal 30 that is displaced at the plate thickness direction switching portion 33*b* is corrected by the displacement portion 36**.

The Z direction extension portion **33*c*2 extends in the +Z direction from the X direction extension portion 33*c*1**.

The width dimension (X direction dimension) of the Z direction extension portion **33*c*2 is smaller than the movable-side retained portion 34 width direction dimension. The Z direction extension portion 33*c*2 is coupled to a width direction central position of the movable-side retained portion 34. A portion of the X direction extension portion 33*cl* from which the Z direction extension portion 33*c*2 extends functions as a portion held in place by a tool when the movable-side retained portion 34 is being press-fitted into the movable housing 20**.

The intermediate portion 33 can be divided into portions surrounded by the housings 10, 20, and a portion not surrounded by the housings 10, 20 (an exposed portion). More specifically, the intermediate portion 33 includes a portion surrounded by the fixed housing 10, a portion not surrounded by the housings 10, 20, and a portion surrounded by the movable housing 20, in that order. The portion surrounded by the fixed housing 10 is part of the first bent portion **33*a*1 of the first coupling portion 33*a*. The portion surrounded by the movable housing 20 is part of the X direction extension portion 33*cl* and the Z direction extension portion 33*c*2 of the second coupling portion 33*c*. The plate thickness direction switching portion 33*b* is formed at the portion not surrounded by the housings 10, 20**.

The movable-side retained portion 34 is a portion retained in the movable housing 20.

The movable-side retained portion 34 is retained in the movable housing 20 by being press-fitted into the movable housing 20 with the +Z direction as the press-fit direction. The movable-side retained portion 34 has a plate thickness direction facing in the Y direction, a plate width direction facing in the X direction, and extends in the +Z direction. The movable-side retained portion 34 includes press-fit protrusions **34*a*. The press-fit protrusions 34*a* are formed only on the X direction inside from out of the plate width directions of the movable-side retained portion 34. The press-fit protrusions 34*a* are formed at plural different locations (two locations in the drawings) in the extension direction of the movable-side retained portion 34. The press-fit protrusions 34*a* formed at the plural locations all bite into the movable housing 20**.

The leading end portion 35 is a portion further toward the other end side than the movable-side retained portion 34.

The leading end portion 35 includes the contact portions **35*b*1, 35*b*2 and resilient support portions 35*a*1, 35*a*2**.

The contact portions **35*b*1, 35*b*2 are portions that contact the counterpart terminals (omitted in the drawings) of the counterpart connector (omitted in the drawings). The counterpart connector is connected with the −Z direction as the connection direction, and is disposed at the X direction inside with respect to the contact portions 35*b*1, 35*b*2. Namely, the X direction inside direction of the contact portions 35*b*1, 35*b*2** makes contact with the counterpart connector.

The contact portions **35*b*1, 35*b*2 include a first contact portion 35*b*1 (first contact portion) and a second contact portion 35*b*2** (second contact portion).

The first contact portion **35*b*1 is a contact portion at a position at the near side in the −Z direction, this being the connection direction of the connection target, and the second contact portion 35*b*2 is a contact portion at a position at the far side in the −Z direction, this being the connection direction of the connection target. The first contact portion 35*b*1 includes a function to wipe a portion of the connection target that will contact the second contact portion 35*b*2**.

An indentation **35*b*3 indented toward the X direction inside is formed at the X direction outside of the first contact portion 35*b*1. A cross-sectional area of the first contact portion 35*b*1** (surface area of cross-section perpendicular to the Z direction) is suppressed from becoming excessively large and impedance is adjusted thereby.

The resilient support portions **35*a*1, 35*a*2 are portions that resiliently support the contact portions 35*b*1, 35*b*2**.

The resilient support portions **35*a*1, 35*a*2 include a first resilient support portion 35*a*1 and a second resilient support portion 35*a*2. The first resilient support portion 35*al* supports the first contact portion 35*b*1, and the second resilient support portion 35*a*2 supports the second contact portion 35*b*2. When the counterpart connector (omitted in the drawings) is connected to the connector 100, the resilient support portions 35*a*1, 35*a*2 resiliently deform such that the contact portions 35*b*1, 35*b*2** are displaced toward the X direction outside.

The first resilient support portion 35*al* extends from a base thereof substantially parallel to the +Z direction and is connected to the first contact portion 35*b*1. The second resilient support portion 35*a*2 extends from a base thereof in a direction inclined toward the +Z direction and X direction outside, and thereafter extends in a direction inclined toward the +Z direction and the X direction inside and is connected to the second contact portion 35*b*2. The second resilient support portion 35*a*2 and the second contact portion 35*b*2 are disposed at the X direction inside with respect to the first resilient support portion 35*a*1.

Fixed Housing 10

Next, detailed description follows regarding the fixed housing 10.

Figure 5:
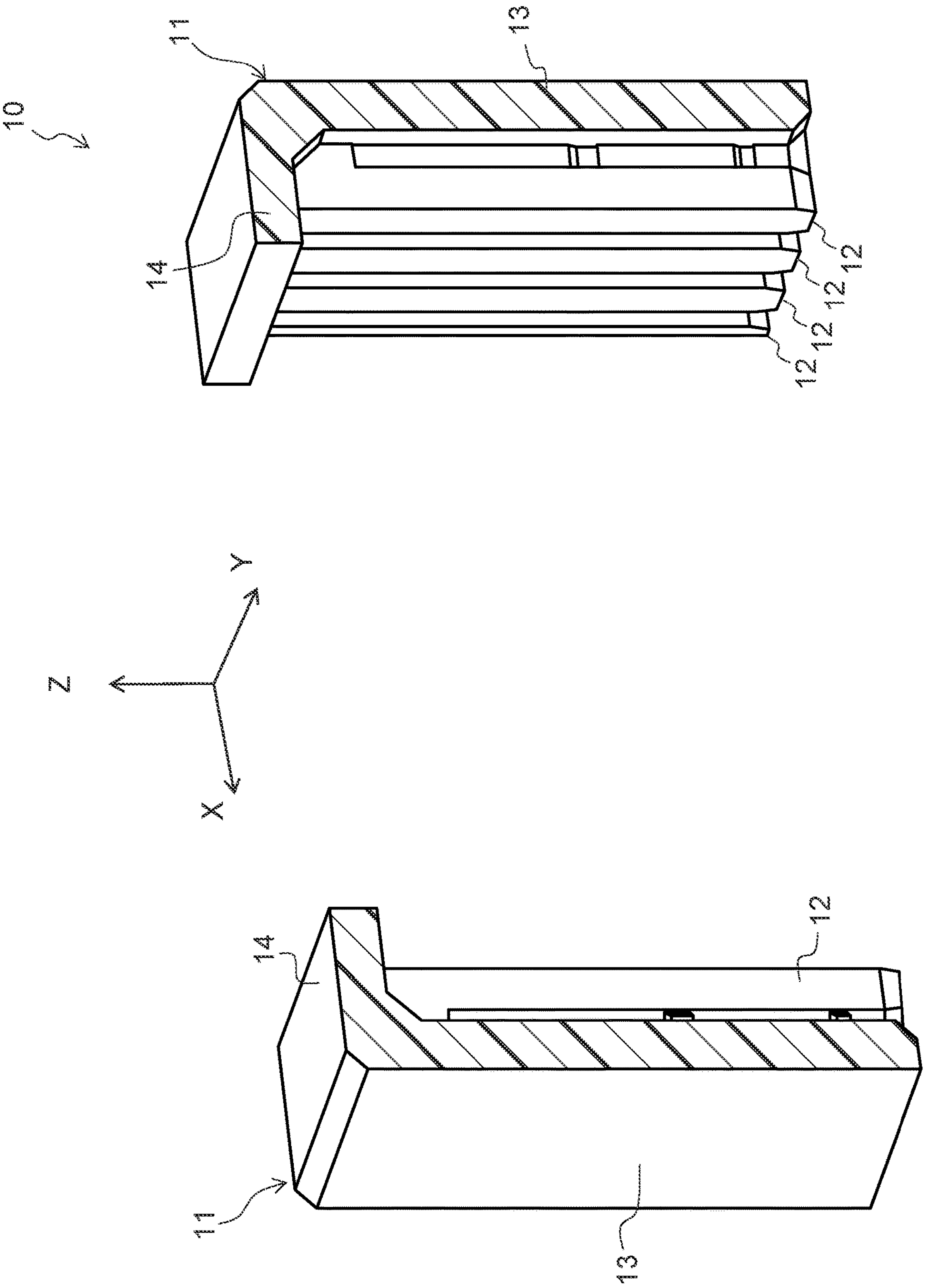
FIG. 5 is a cross-section perspective view of a fixed housing.

As illustrated in FIG. 5, the fixed housing 10 includes a front side terminal retaining portion 11 and a rear side terminal retaining portion 11. The front side terminal retaining portion 11 and the rear side terminal retaining portion 11 have the same structure as each other. These are both referred to simply as terminal retaining portions 11 when not discriminating therebetween.

The terminal retaining portions 11 each include plural array direction walls 12.

The array direction walls 12 are disposed with respect to the fixed-side retained portion 32 of the terminal 30 at positions on both sides thereof in the Y direction, which is the array direction and plate width direction. The fixed-side retained portions 32 are each press-fitted into a space between adjacent array direction walls 12 from out of the plural array direction walls 12. These spaces are open toward the X direction inside. These open portions thereby enable the intermediate portion 33 (more specifically the first bent portion 33*a*1) of each of the terminals 30 to pass through when the fixed-side retained portion 32 is being press-fitted.

The terminal retaining portions 11 each include an outside wall 13.

The outside wall 13 is disposed at a position on the X direction outside with respect to the fixed-side retained portions 32. The outside wall 13 is connected to the X direction outside ends of the plural array direction walls 12.

The terminal retaining portions 11 each include a top wall 14.

The top wall 14 is positioned further in the +Z direction than the fixed-side retained portion 32 and part of the intermediate portion 33. The top wall 14 is connected to the +Z direction side of the plural array direction walls 12. The top wall 14 extends from a +Z direction end of the outside wall 13 toward the X direction inside.

Movable Housing 20

Next detailed explanation follows regarding the movable housing 20.

Figure 6:
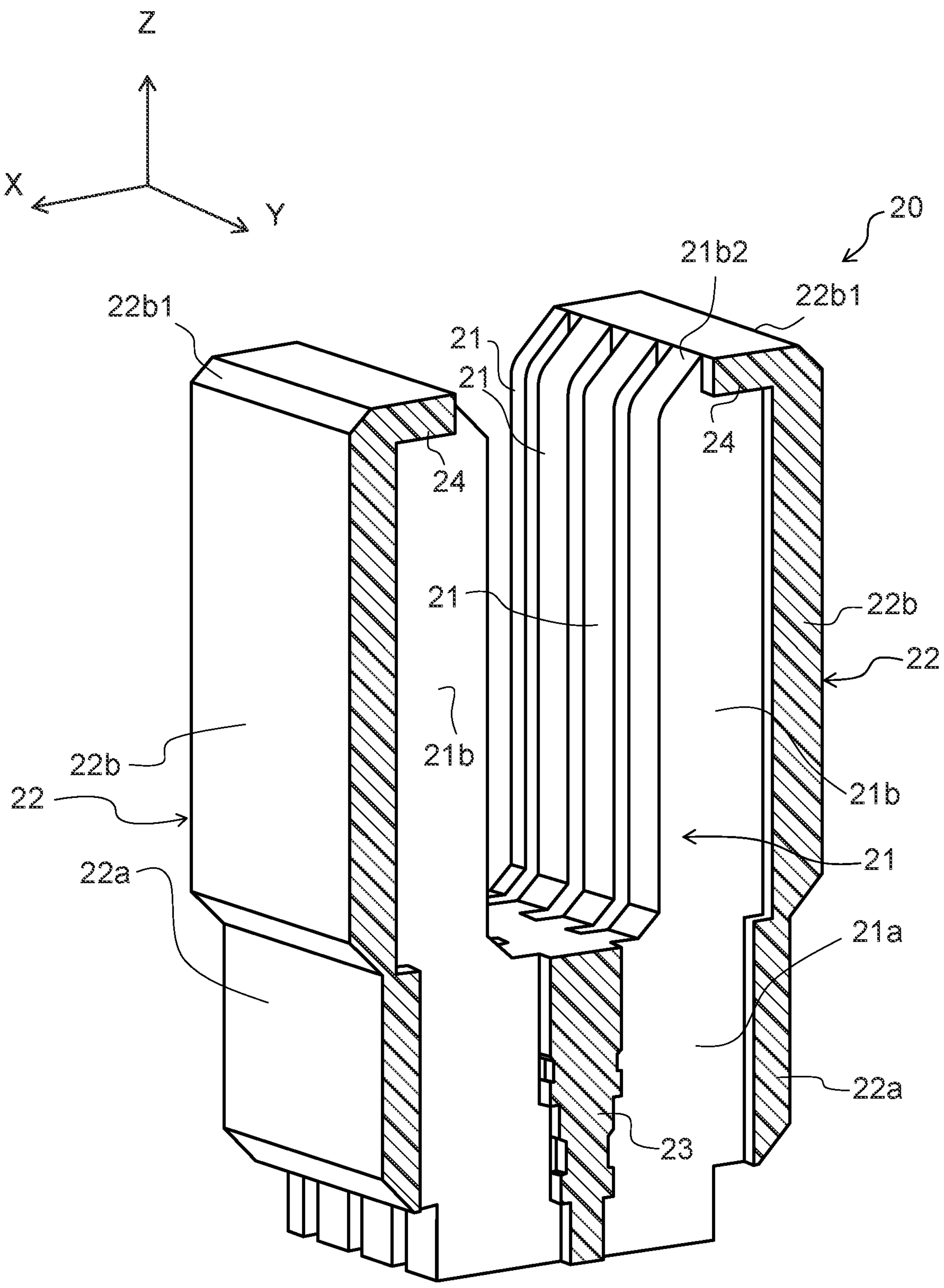
FIG. 6 is a cross-section perspective view of a movable housing.

As illustrated in FIG. 6, the movable housing 20 includes plural array direction walls 21.

The array direction walls 21 are disposed at positions with respect to parts of the terminals 30 on both sides thereof in the Y direction, which is the array direction. The array direction walls 21 positioned between adjacent terminals 30 from out of the plural array direction walls 21 are sometimes referred to as separation walls 21. The array direction walls 21 include guide faces 21*b*2 to guide the counterpart connector (omitted in the drawings) to an appropriate position in the X direction.

The array direction walls 21 include a lower array direction wall 21*a* and an upper array direction wall 21*b*.

The lower array direction wall 21*a* corresponds to the movable-side retained portion 34 and part of the intermediate portion 33.

The upper array direction wall 21*b* corresponds to the leading end portion 35.

The upper array direction wall 21*b* is separated into a front side portion and a rear side portion. A space for inserting part of the counterpart connector (omitted in the drawings) into is formed between the upper array direction wall 21*b* on the front side and the upper array direction wall 21*b* on the rear side.

The lower array direction wall 21*a* is integrally formed with a front side portion and a rear side portion.

The movable housing 20 includes a front-rear pair of outside walls 22.

The outside walls 22 are positioned at the X direction outside with respect to part of the terminals 30. The outside walls 22 couple the plural array direction walls 21 together at X direction outside portions thereof. The outside walls 22 each include a guide face 22*b*1 to guide the counterpart connector (omitted in the drawings) to an appropriate position in the X direction.

The outside walls 22 each include a lower outside wall 22*a* and an upper outside wall 22*b*.

The lower outside wall 22*a* corresponds to the movable-side retained portion 34.

The upper outside wall 22*b* corresponds to the leading end portion 35. The upper outside wall 22*b* is formed further to the X direction outside than the lower outside wall 22*a*, and a space inside the movable housing 20 is widened at an upper portion thereof.

The movable housing 20 includes an array direction coupling wall 23.

The array direction coupling wall 23 couples the plural lower array direction walls 21*a* together in the array direction.

Spaces between the array direction coupling wall 23 and the lower outside wall 22*a* are spaces through which the leading end portions 35 of the terminals 30 pass when assembling the terminals 30 to the movable housing 20 and in which the movable-side retained portions 34 are disposed. The movable-side retained portions 34 are press-fitted between the array direction coupling wall 23 and the lower outside wall 22*a*.

The movable housing 20 includes a top wall 24. The top wall 24 extends from an upper end of the outside walls 22 toward the X direction inside.

Operation and Advantageous Effects

Next, description follows regarding the operation and advantageous effects of the present exemplary embodiment.

In the present exemplary embodiment, as illustrated in FIG. 1 to FIG. 3, the connector 100 includes the terminals 30, the first housing 10, and the second housing 20.

As illustrated in FIG. 4, the terminals 30 each include the first retained portion 32 retained in the first housing 10, the second retained portion 34 retained in the second housing 20, and the intermediate portion 33 coupling the first retained portion 32 and the second retained portion 34 together.

Taking the plate width direction of the first retained portion 32 as the first plate width direction (Y direction), then the plate thickness direction of the second retained portion 34 faces in a direction intersecting with a plane (ZX plane) perpendicular to the first plate width direction (Y direction).

The intermediate portion 33 includes the plate thickness direction switching portion 33*b*. The plate thickness direction switching portion 33*b* includes the switching-bend portion 33*b*2 bent in the plate thickness direction, the first plate face portion 33*b*1 formed at the first retained portion 32 side with respect to the switching-bend portion 33*b*2, and the second plate face portion 33*b*3 formed at the second retained portion 34 side with respect to the switching-bend portion 33*b*2.

The first plate face portion 33*b*1 has a plate thickness direction facing in a direction parallel to the plane (ZX plane) perpendicular to the first plate width direction (Y direction). This means that a simple shape is sufficient for a portion (the first coupling portion 33*a*) connecting the first retained portion 32 and the first plate face portion 33*b*1 together.

The second plate face portion 33*b*3 has a plate thickness direction facing in a direction (Y direction) intersecting with the plane (ZX plane) perpendicular to the first plate width direction (Y direction). This means that a simple shape is sufficient for a portion (the second coupling portion 33*c*) connecting the second retained portion 34 and the second plate face portion 33*b*3 together.

Moreover, the intermediate portion 33 includes the plate thickness direction switching portion 33*b*, and so this enables the connector 100 to be applied to high speed transmission. This is because although the impedance is liable to rise at the intermediate portion 33 not retained by either of the housings, adjustment of the impedance can be performed by forming the intermediate portion 33 with the plate thickness direction switching portion 33*b* having a cross-sectional area readily enlarged.

Moreover in the present exemplary embodiment, the plate width direction of the fixed-side retained portion 32 faces in a direction perpendicular to the contact portion-side directions (directions where the contact portions 35*b*1, 35*b*2 are positioned with respect to the connection portion 31, when viewed along the Z direction). The terminals 30 each include the connection portion 31 for connecting to the mounting target, and one end side of the first retained portion 32 is coupled to the connection portion 31 side and the other end side thereof is coupled to the first plate face portion 33*b*1 side.

This means that there is no need to form as a projection portion (see Patent Documents 1 to 3) a portion press-fitted into the first housing. As a result thereof, this enables reflection of an electrical signal to be prevented from being causes thereby.

Moreover, in the present exemplary embodiment, the terminals 30 include the leading end portion 35, and the leading end portion 35 has a flat plate shape having a plate thickness direction that faces in a direction intersecting with a plane perpendicular to the first plate width direction.

Thus for the connector 100, for which a direction of contact of the terminals 30 with a connection target B1 (the X direction inside) is a direction parallel to the plane (ZX plane) that is perpendicular to the first plate width direction (Y direction), the terminals 30 can be configured such that the resilient support portions 35*a*1, 35*a*2 resiliently deform in a direction intersecting with the plate thickness direction thereof in the connector 100 that includes the resilient support portions 35*a*1, 35*a*2 for resiliently supporting the contact portions 35*b*1, 35*b*2. As a result thereof, a contact pressure can be controlled by ingenuity in the shape punched from a plate material, making it easy to realize a desired contact pressure.

Although different from the present exemplary embodiment, this thereby also facilitates realization of a connector having leading end portions lacking resilient support portions (for example, a connector in which one plate thickness direction side face of the leading end portion contacts the connection target, or a connector that contacts the connection target such that both plate thickness direction sides of the leading end portion are sandwiched).

Moreover, in the present exemplary embodiment the intermediate portion 33 couples the first retained portion 32 and the first plate face portion 33*b*1 together and includes the first coupling portion 33*a* that extends from the first retained portion 32 to the first plate face portion 33*b*1 with a plate thickness direction facing in a direction parallel to the plane (ZX plane) that is perpendicular to the first plate width direction (Y direction).

The first coupling portion 33*a* includes a bent portion 33*al* that is bent such that the plate thickness direction thereof changes within the plane (ZX plane) perpendicular to the first plate width direction (Y direction). This accordingly facilitates making the connector 100 more compact in the extension direction of the first retained portion 32 compared to embodiments in which the first coupling portion 33*a* lacks such a first bent portion 33*al*.

Moreover, in the present exemplary embodiment, the second retained portion 34 has a plate thickness direction that faces in the first plate width direction (Y direction). A first plate width direction (Y direction) distance between the second retained portion 34 and the first retained portion 32 is smaller than a first plate width direction (Y direction) distance between the switching-bend portion 33*b*2 and the first retained portion 32.

This means that the connector 100 can be made more compact in the first plate width direction (Y direction) than for embodiments in which the first plate width direction (Y direction) distance between the second retained portion 34 and the first retained portion 32 is the same as the first plate width direction (Y direction) distance between the switching-bend portion 33*b*2 and the first retained portion 32 (a first modified example and a second modified example described later).

MODIFIED EXAMPLES

Figure 7:
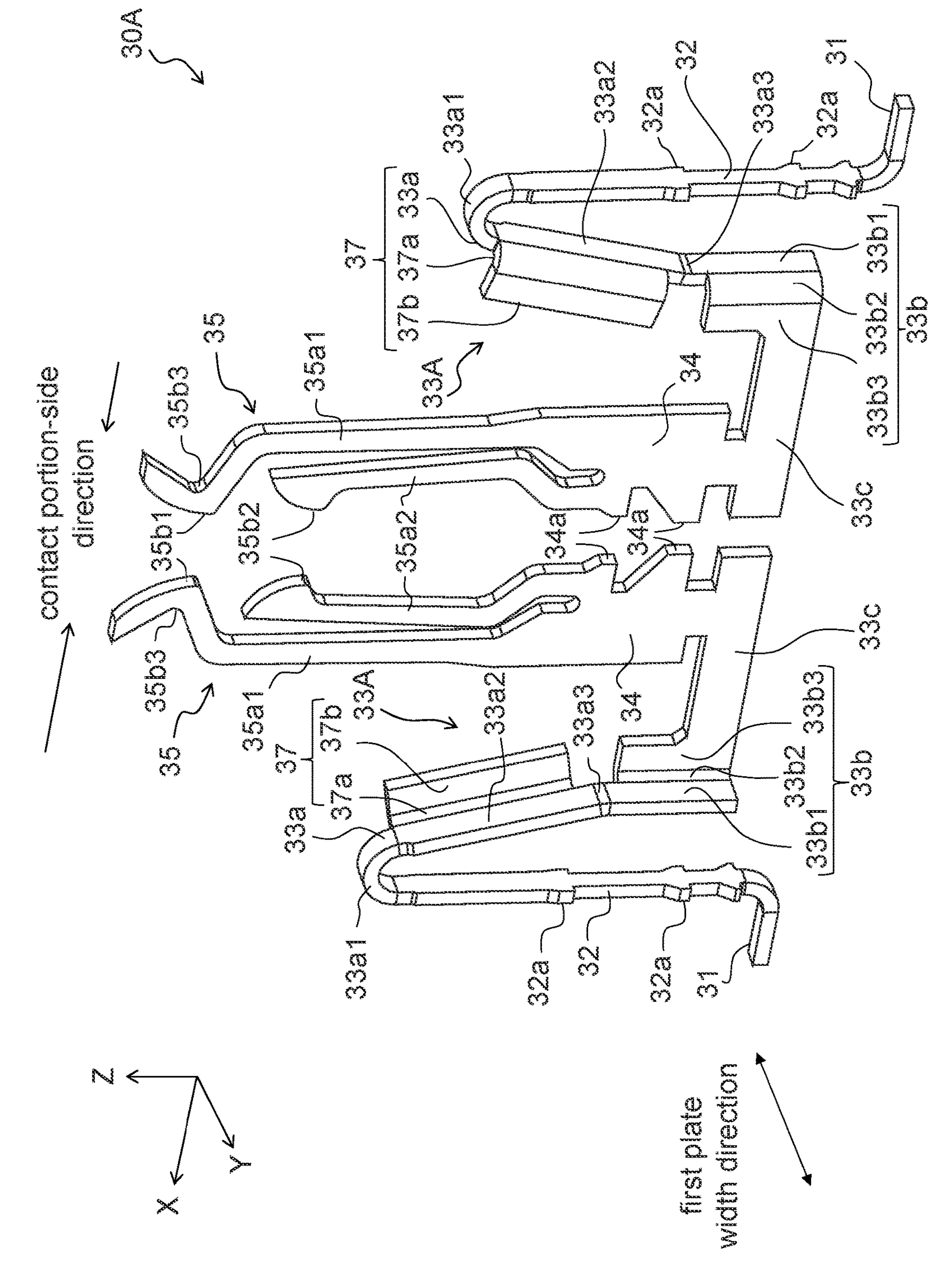
FIG. 7 is a perspective view of a front-rear pair of terminals of a first modified example.
Figure 8:
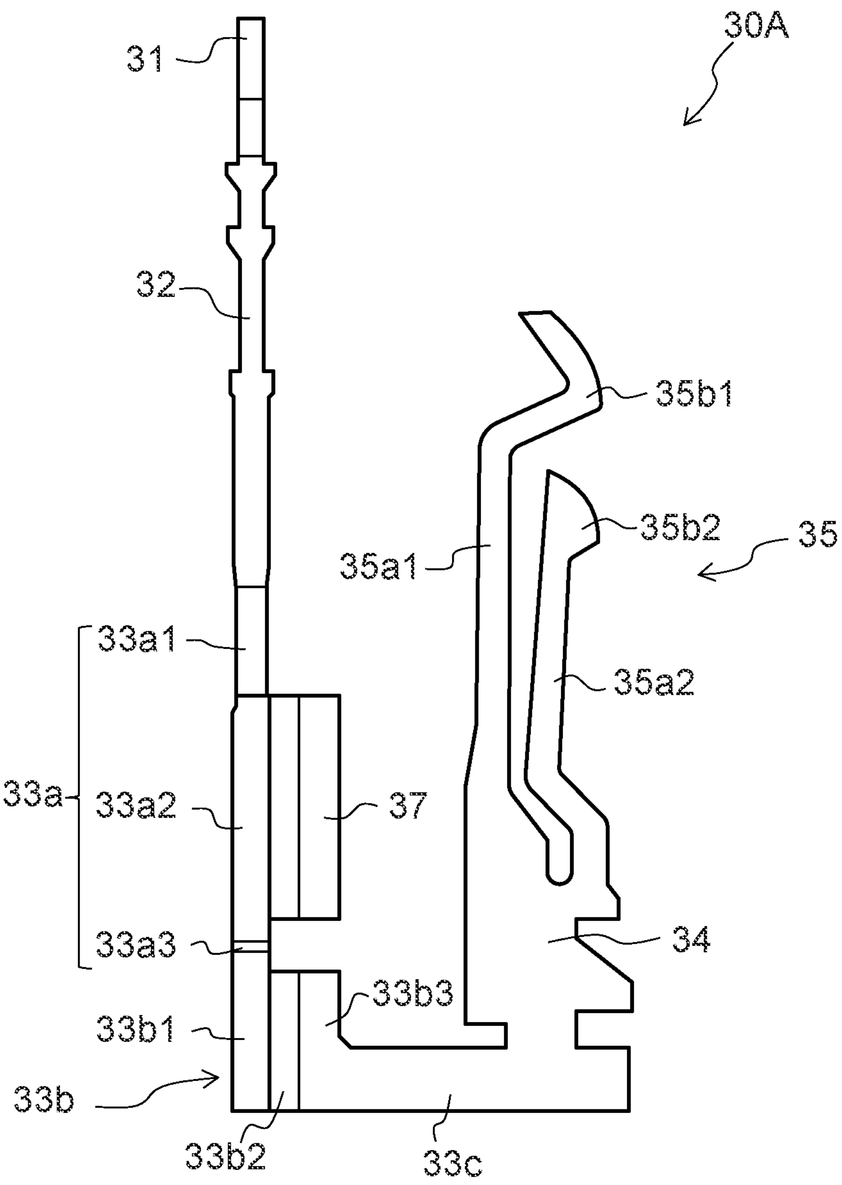
FIG. 8 is a diagram illustrating an opened out state of a terminal of the first modified example.
Figure 9:
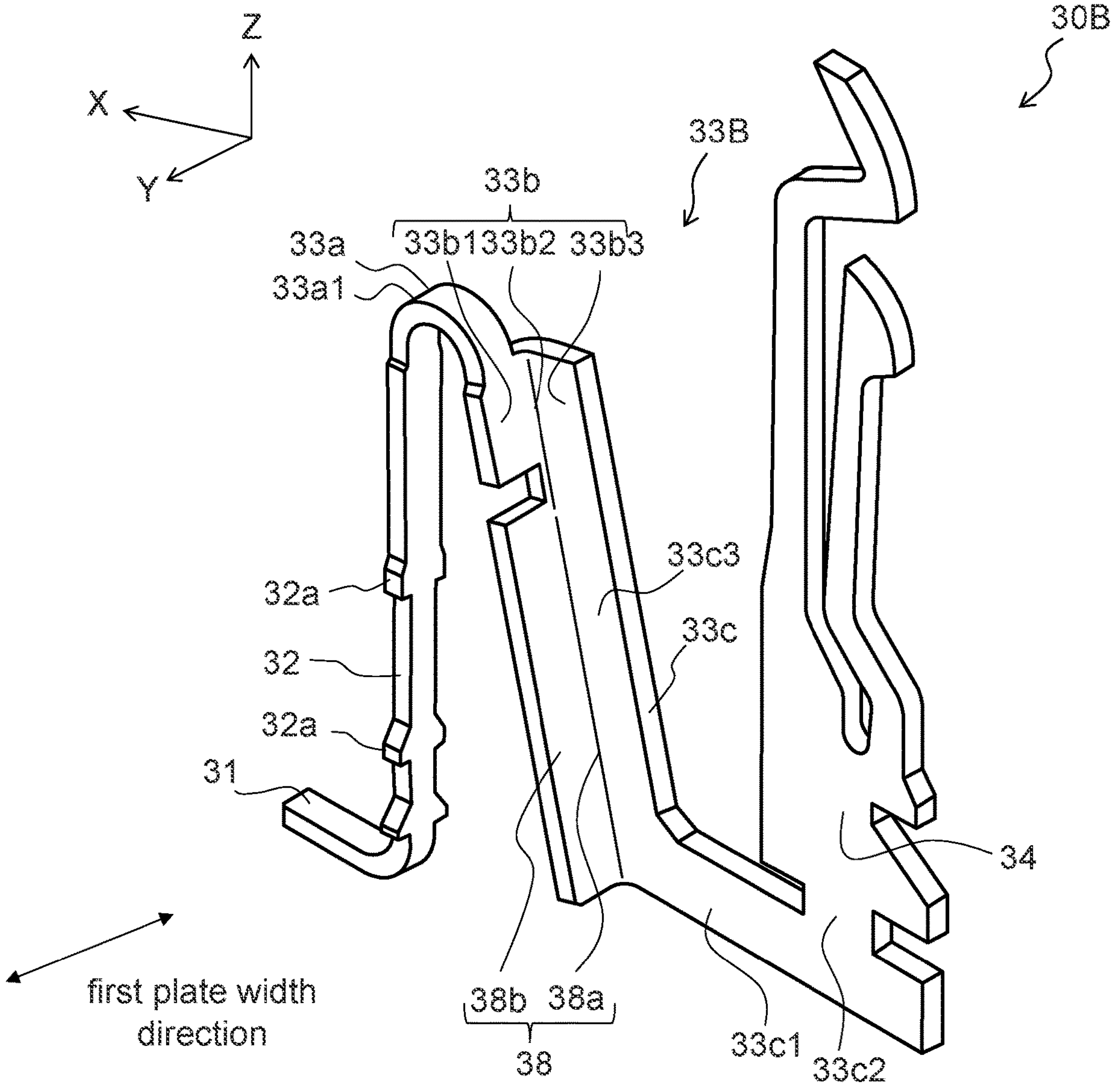
FIG. 9 is a perspective view of a terminal of a second modified example.

FIG. 7 to FIG. 9 illustrate a first modified example and a second modified example.

A main point of difference of each of these modified examples to the above exemplary embodiment is the structure of an intermediate portion of the terminals.

First Modified Example

FIG. 7 illustrates a terminal 30A of the first modified example.

A feature of the terminal 30A of the first modified example is that it includes a first impedance adjustment section 37.

The terminal 30A includes a connection portion 31, a fixed-side retained portion 32, an intermediate portion 33A, a movable-side retained portion 34, and a leading end portion 35, in that order.

The intermediate portion 33A includes a first coupling portion 33*a*, a plate thickness direction switching portion 33*b*, and a second coupling portion 33*c*.

The first coupling portion 33*a* includes a first bent portion 33*a*1, a straight line portion 33*a*2, and a second bent portion 33*a*3.

The first bent portion 33*al* is a portion bent in the plate thickness direction, and switches a Z direction component of the extension direction of the terminals 30 from plus to minus.

The straight line portion 33*a*2 is connected to the first bent portion 33*al* and extends toward the other end side (contact portion 35*b*1, 35*b*2 side) of the terminal 30. The straight line portion 33*a*2 is a portion having a straight line shaped extension direction. The extension direction of the straight line portion 33*a*2 is a direction inclined toward the −Z direction and the X direction inside. The plate width direction of the straight line portion 33*a*2 faces in the Y direction, which is a first plate width direction.

The second bent portion 33*a*3 is a portion bent in the plate thickness direction, and an X direction component of the extension direction of the terminal 30 transitions from plus to zero.

The plate thickness direction switching portion 33*b* includes a switching-bend portion 33*b*2, the first plate face portion 33*b*1, and the second plate face portion 33*b*3.

The switching-bend portion 33*b*2 is a portion bent in the plate thickness direction, and couples the first plate face portion 33*b*1 and the second plate face portion 33*b*3 together.

The first plate face portion 33*b*1 has a flat plate shape and a plate thickness direction that faces in the X direction, this being in a ZX plane direction.

The first plate face portion 33*b*1 is connected to the first coupling portion 33*a*, and can be thought of as being a portion extending toward the other end side of the terminal 30 (the contact portion 35*b*1, 35*b*2 side thereof). When thought of in this manner, the first plate face portion 33*b*1 is a portion having a straight line shaped extension direction. The extension direction of the first plate face portion 33*b*1 is the −Z direction. The plate width direction of the first plate face portion 33*b*1 faces in the Y direction, which is the first plate width direction.

The second plate face portion 33*b*3 can be thought of as being a portion extending parallel to the first plate face portion 33*b*1 and toward the other end side of the terminal 30 (the contact portion 35*b*1, 35*b*2 side thereof). When thought of in this manner, the second plate face portion 33*b*3 is a portion having a straight line shaped extension direction. The extension direction of the second plate face portion 33*b*3 is a −Z direction.

A difference to the above exemplary embodiment in that there is no displacement portion (see the displacement portion 36 of FIG. 4) formed to the X direction extension portion 33*c*1, however one may be formed thereto.

The first coupling portion 33*a* includes the first impedance adjustment section 37.

The first impedance adjustment section 37 extends from a plate width direction outside of the straight line portion 33*a*2 of the first coupling portion 33*a*. The first impedance adjustment section 37 extends from the straight line portion 33*a*2 at the plate width direction on the same side as that of the second plate face portion 33*b*3 of the plate thickness direction switching portion 33*b*.

The first impedance adjustment section 37 includes a flat plate portion 37*b* and a bent portion 37*a*.

The bent portion 37*b* has a flat plate shape with a plate thickness direction facing in the Y direction.

The bent portion 37*a* is a portion bent in the plate thickness direction and coupling the straight line portion 33*a*2 of the first coupling portion 33*a* and the bent portion 37*b* together.

The first impedance adjustment section 37 and the plate thickness direction switching portion 33*b* are formed at portions not surrounded by the housings 10, 20.

FIG. 8 is a diagram illustrating an opened out state of the terminal 30A (a state that might also be referred to as a state prior to bending).

The connection portion 31, the fixed-side retained portion 32, the first coupling portion 33*a*, and the plate thickness direction switching portion 33*b* are arranged in a straight line shape (straight line shape in the up-down direction in the drawings), with the straight line direction being parallel to a direction along which the second retained portion 34 and the leading end portion 35 are arranged. This accordingly means that the material of the terminal 30 can be used more efficiently than embodiments lacking such a layout relationship (for example, the terminal 30 of the above exemplary embodiment or a terminal 30B of the second modified example).

The present modified example includes the first impedance adjustment section 37 that extends from the first coupling portion 33*a* with a plate thickness direction facing in a direction (the Y direction) intersecting with a plane (ZX plane) perpendicular to the first plate width direction (Y direction).

This accordingly enables the impedance of the intermediate portion 33 to be lowered while suppressing the dimension of the intermediate portion 33 from becoming large in the first plate width direction (Y direction).

Moreover, the present modified example includes the first coupling portion 33*a* and the second bent portion 33*a*3. The second bent portion 33*a*3 is a bent portion bent such that the plate thickness direction changes within a plane (ZX plane) perpendicular to the first plate width direction (Y direction), and is a bent portion formed at a position further to a plate thickness direction switching portion 33*b* side than a portion (the straight line portion 33*a*2) of the first coupling portion 33*a* from where the first impedance adjustment section 37 extends.

This means that, different to embodiments having a first coupling portion 33*a* not including the second bent portion 33*a*3 (for example, the terminal 30 of the above exemplary embodiment, and the terminal 30B of the second modified example), the plate thickness direction of the first plate face portion 33*b*1 is able to be made a different direction to the plate thickness direction of the portion (the straight line portion 33*a*2) of the first coupling portion 33*a* from where the first impedance adjustment section 37 extends.

Second Modified Example

A feature of the terminal 30B of the second modified example is that it includes a second impedance adjustment section 38.

The terminal 30B includes a connection portion 31, a fixed-side retained portion 32, an intermediate portion 33B, a movable-side retained portion 34, and a leading end portion 35, in that order.

The intermediate portion 33B includes a first coupling portion 33*a*, a plate thickness direction switching portion 33*b*, and a second coupling portion 33*c*.

The first coupling portion 33*a* includes the first bent portion 33*a*1.

The plate thickness direction switching portion 33*b* includes a switching-bend portion 33*b*2, a first plate face portion 33*b*1, and a second plate face portion 33*b*3.

The plate thickness direction switching portion 33*b* is shorter in the extension direction than that of the above exemplary embodiment.

The second coupling portion 33*c* includes an inclined extension portion 33*c*3 further to a one end side (the fixed-side retained portion 32 side) than the X direction extension portion 33*cl.*

The inclined extension portion 33*c*3 is connected to the second plate face portion 33*b*3 of the plate thickness direction switching portion 33*b*, and is a portion extending toward the other end side (contact portion 35*b*1, 35*b*2 side) of the terminal 30. A portion bent in the plate thickness direction is not formed between the inclined extension portion 33*c*3 and the second plate face portion 33*b*3. The inclined extension portion 33*c*3 is a portion having a straight line shaped extension direction. The extension direction of the inclined extension portion 33*c*3 is a direction inclined toward the −Z direction and the X direction inside. The plate thickness direction of the inclined extension portion 33*c*3 faces in the Y direction, which is the first plate width direction.

The intermediate portion 33B includes the second impedance adjustment section 38.

The second impedance adjustment section 38 extends from a plate width direction outside of the inclined extension portion 33*c*3 of the second coupling portion 33*c*.

The second impedance adjustment section 38 includes a flat plate portion 38*b* and a bent portion 38*a*.

The flat plate portion 38*b* has a flat plate shape. The flat plate portion 38*b* has a plate thickness direction facing in the same direction as the plate thickness direction of the first plate face portion 33*b*1 of the plate thickness direction switching portion 33*b*. A Y direction orientation of the flat plate portion 38*b* with respect to the second coupling portion 33*c* is the same as a Y direction orientation of the first plate face portion 33*b*1 with respect to the second plate face portion 33*b*3. The Y direction dimension of the intermediate portion 33B is thereby suppressed from becoming large.

The bent portion 38*a* is a portion bent in the plate thickness direction, and couples the inclined extension portion 33*c*3 of the second coupling portion 33*c* and the flat plate portion 38*b* together.

In the present modified example, the intermediate portion 33B includes the second impedance adjustment section 38 that extends from the second coupling portion 33*c* and that has a plate thickness direction facing in a different direction to the plate thickness direction of the extended portion of the second coupling portion 33*c* (the inclined extension portion 33*c*3 in the present modified example).

This thereby enables the impedance of the intermediate portion 33B to be lowered while suppressing the dimension of the intermediate portion 33B from becoming larger in the plate width direction of the second coupling portion 33*c*.

Although the present disclosure has been described by way of exemplary embodiments and modified examples, the present disclosure is not limited thereto.

EXPLANATION OF REFERENCE NUMERALS

100 connector
10 fixed housing (first housing)
20 movable housing (second housing)
30 terminal
30A terminal
30B terminal
31 connection portion
32 fixed-side retained portion (first retained portion)
33 intermediate portion
33A intermediate portion
33B intermediate portion
33*a* first coupling portion
33*a*1 first bent portion
33*a*2 straight line portion
33*a*3 second bent portion
33*b* plate thickness direction switching portion
33*b*2 switching-bend portion
33*b*1 first plate face portion
33*b*3 second plate face portion
33*c* second coupling portion
33*c*3 inclined extension portion
33*cl* X direction extension portion
33*c*2 Z direction extension portion
34 movable-side retained portion (second retained portion)
36 displacement portion
37 first impedance adjustment section
38 second impedance adjustment section

The invention claimed is:

1. A connector comprising:
a terminal;
a first housing; and
a second housing capable of moving with respect to the first housing;
wherein the terminal includes
 a first retained portion retained in the first housing,
 a second retained portion retained in the second housing, and
 an intermediate portion coupling the first retained portion and the second retained portion together; and
taking a plate width direction of the first retained portion as a first plate width direction, then a plate thickness direction of the second retained portion faces in a direction intersecting with a plane perpendicular to the first plate width direction;
the intermediate portion includes a plate thickness direction switching portion; and
the plate thickness direction switching portion includes
 a switching-bend portion bent in a plate thickness direction,
 a first plate face portion formed further to a side of the first retained portion with respect to the switching-bend portion and having a plate thickness direction facing in a direction parallel to a plane perpendicular to the first plate width direction, and
 a second plate face portion formed further to a side of the second retained portion with respect to the switching-bend portion and having a plate thickness direction facing in a direction intersecting with a plane perpendicular to the first plate width direction.

2. The connector of claim 1, wherein:
the intermediate portion includes a first coupling portion that couples the first retained portion and the first plate face portion together, and that extends from the first retained portion to the first plate face portion with a plate thickness direction facing in a direction parallel to a plane perpendicular to the first plate width direction; and the first coupling portion includes a bent portion bent such that a plate thickness direction changes within a plane perpendicular to the first plate width direction.

3. The connector of claim 1, wherein the intermediate portion includes:

a first coupling portion that couples the first retained portion and the first plate face portion together and that extends from the first retained portion to the first plate face portion with a plate thickness direction facing in a direction parallel to a plane perpendicular to the first plate width direction; and a first impedance adjustment section that extends from the first coupling portion with a plate thickness direction facing in a direction intersecting with a plane perpendicular to the first plate width direction.

4. The connector of claim 3, wherein the first coupling portion is a bent portion bent such that a plate thickness direction changes within a plane perpendicular to the first plate width direction, and includes a second bent portion formed at a position further to a side of the plate thickness direction switching portion than a portion of the first coupling portion from where the first impedance adjustment section extends.

5. The connector of claim 1, wherein the intermediate portion includes:

a second coupling portion that couples the second plate face portion and the second retained portion together; and a second impedance adjustment section that extends from the second coupling portion and has a plate thickness direction facing in a different direction to a plate thickness direction of an extended portion of the second coupling portion.

6. The connector of claim 1, wherein:

the second retained portion has a plate thickness direction facing in the first plate width direction; and a distance in the first plate width direction between the second retained portion and the first retained portion is smaller than a distance in the first plate width direction between the switching-bend portion and the first retained portion.

* * * * *